US012806871B2

(12) United States Patent
Ahn et al.

(10) Patent No.: US 12,806,871 B2
(45) Date of Patent: Nov. 24, 2026

(54) TRIMMING AND SCRAP REMOVAL SYSTEM FOR COMPOSITE STRUCTURES

(71) Applicant: The Boeing Company, Chicago, IL (US)

(72) Inventors: Jonathan Young Ahn, Seattle, WA (US); Christopher Robert Brown, Seattle, WA (US); Ricardo Andreas Fritzke, Sammamish, WA (US); Austin Ball, Seattle, WA (US); Jonathan Jeyachandran, Seattle, WA (US); Benjamin Bentley, Spanaway, WA (US); Sang Vinh Van Nguyen, Seattle, WA (US); Kimhoeut Sithat, Kent, WA (US); Cameron Bunch, Auburn, WA (US)

(73) Assignee: The Boeing Company, Arlington, VA (US)

(*) Notice: Subject to any disclaimer, the term of this patent is extended or adjusted under 35 U.S.C. 154(b) by 806 days.

(21) Appl. No.: 18/061,132

(22) Filed: Dec. 2, 2022

(65) Prior Publication Data

US 2024/0181725 A1 Jun. 6, 2024

(51) Int. Cl.
*B25J 11/00* (2006.01)
*B25J 9/16* (2006.01)
*B29C 70/54* (2006.01)

(52) U.S. Cl.
CPC ........... *B29C 70/545* (2013.01); *B25J 9/1697* (2013.01); *B25J 11/0055* (2013.01); *B29C 2793/009* (2013.01)

(58) Field of Classification Search
CPC ...... B26D 7/204; B26D 7/086; B32B 17/1099
USPC .................... 83/642, 956, 373, 654; 264/480
See application file for complete search history.

(56) References Cited

U.S. PATENT DOCUMENTS

| | | | | |
|---|---|---|---|---|
| 3,494,396 A * | 2/1970 | Collins | B27M 1/00 | 144/175 |
| 4,592,261 A * | 6/1986 | Miyaji | B32B 17/1099 | 83/788 |
| 4,879,933 A * | 11/1989 | Floreancig | B32B 17/10761 | 83/171 |
| 4,979,411 A * | 12/1990 | Murasaki | C03B 33/078 | 83/167 |
| 5,159,865 A * | 11/1992 | Hinckley | B26D 7/086 | 83/16 |
| 5,168,787 A | 12/1992 | Blaimschein | | |
| 5,265,508 A * | 11/1993 | Bell | B29D 30/46 | 83/136 |
| 6,530,768 B1 * | 3/2003 | Harrop | B26D 7/086 | 99/451 |

(Continued)

FOREIGN PATENT DOCUMENTS

| | | | |
|---|---|---|---|
| DE | 3437908 A * | 5/1985 | B26D 7/086 |
| DE | 9413647 U1 | 11/1994 | |

*Primary Examiner* — Boyer D Ashley
*Assistant Examiner* — Samuel A Davies
(74) *Attorney, Agent, or Firm* — Yee & Associates, P.C.

(57) ABSTRACT

A composite manufacturing system is provided. The composite manufacturing system comprises a robotic arm and a trimming and scrap removal system connected to the robotic arm. The trimming system and scrap removal comprises an ultrasonic knife, an ultrasonic parting horn, and a web support. The parting horn is configured to push scrap away from a trimmed part before the scrap has a chance to heat weld back to the trimmed part.

27 Claims, 13 Drawing Sheets

(56) References Cited

U.S. PATENT DOCUMENTS

| | | | |
|---|---|---|---|
| 8,640,757 B2 | 2/2014 | McCowin et al. | |
| 2011/0100178 A1* | 5/2011 | Tanaka | B29C 37/02<br>83/78 |
| 2015/0007704 A1 | 1/2015 | Vieira | |
| 2018/0125090 A1* | 5/2018 | Skoglund | B26D 1/08 |
| 2020/0164539 A1* | 5/2020 | Blanchette | B26D 3/08 |
| 2020/0376783 A1* | 12/2020 | Ahn | B29C 70/545 |

* cited by examiner

TRIMMING AND SCRAP REMOVAL SYSTEM FOR COMPOSITE STRUCTURES

BACKGROUND INFORMATION

1. Field

The present disclosure relates generally to manufacturing composite structures. More specifically, the present disclosure relates to a trimming system used in manufacturing composite structures for aircraft applications.

2. Background

Manufacturers use composite structures to provide lightweight and structurally sound parts for various applications. Increasing the efficiency of the composite manufacturing process is a priority for aircraft manufacturers. They seek to lower costs and increase the rate at which an aircraft is produced while minimizing the risk of rework or discarding of composite parts during the process.

In fabricating parts, composite structures are trimmed into desired configurations. Trimming may be a time-consuming and complex process. Some composite structures used for aircraft applications are 70+ feet in length. Orienting and moving such large structures about a manufacturing floor requires time, space, and manpower.

A composite structure may be trimmed into a desired part prior to or after curing using an ultrasonic knife. However, given the physics of an ultrasonic knife system, which is vibrations, the entire cutting process causes the composite structure being trimmed and the knife blade to increase in temperature. The heat may cause the resin of the composite structure to further flow out of the cut region which can act as a glue and cause the scrap trimmed from the cut part to heat weld back to the cut part before the resin can naturally cool and harden. When this happens, it is more difficult to separate the scrap from the desired part.

Therefore, it would be desirable to have a method and apparatus that takes into account at least some of the issues discussed above, as well as other possible issues.

SUMMARY

An illustrative embodiment of the present disclosure provides trimming and scrap removal system for composite structures. The trimming and scrap removal system comprises an ultrasonic knife connected to a robotic arm. The ultrasonic knife is configured to trim an uncured composite structure along a path. The trimming and scrap removal system further comprise an ultrasonic parting horn connected to the robotic arm. The ultrasonic parting horn is configured to separate scrap from the uncured composite structure. A position of the ultrasonic parting horn relative to the ultrasonic knife is adjustable. The trimming and scrap removal system further comprises a web support connected to the robotic arm. A position of the web support relative to both the ultrasonic knife and the ultrasonic parting horn is adjustable.

Another illustrative embodiment of the present disclosure provides a method for trimming and removing scrap from a composite structure. An ultrasonic knife is positioned relative to an uncured composite structure and the ultrasonic knife is connected to a robotic arm. A parting horn is positioned relative to the ultrasonic knife and spaced from the uncured composite structure. The parting horn is connected to the robotic arm. The uncured composite structure is trimmed with the ultrasonic knife along a path. The scrap from the uncured composite structure is separated from the uncured composite structure with the parting horn along the path.

A further illustrative embodiment of the present disclosure provides a composite manufacturing system comprising a robotic arm and a trimming and scrap removal system for composite structures. The trimming and scrap removal system comprises an ultrasonic knife connected to the robotic arm and a parting horn connected to the robotic arm. The ultrasonic knife is configured to trim an uncured composite structure along path while the parting horn is configured to separate scrap from the uncured composite structure. A position of the parting horn relative to the ultrasonic knife is adjustable.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current ultrasonic systems utilize either a gantry or tabletop bed with the use of a commercial, off the shelf ultrasonic trimming system. These solutions typically do not provide scrap removal or management other than manually removing the scrap.

The illustrative embodiments also recognize and take into account that during trimming of composite structures with an ultrasonic system, the trimmed part and the knife blade of the ultrasonic system may increase in temperature such that the resin of the composite structure being trimmed may bleed through the cut region and cause the scrap and the desired part to stick together. Essentially heat welding the scrap back to the trimmed part.

Thus, the disclosed embodiments provide a trimming and scrap removal system for composite parts having an ultrasonic knife connected to a robotic arm, an ultrasonic parting horn connected to the robotic arm, and a web support connected to the robotic arm. The ultrasonic knife is configured to trim an uncured composite structure along a path. The ultrasonic parting horn is configured to separate scrap from the uncured composite structure so that the scrap does not stick to the trimmed part. Composite structures may be trimmed prior to or after curing and multiple robots may move about the manufacturing environment to trim the composite structure at the same time.

Figure 1:
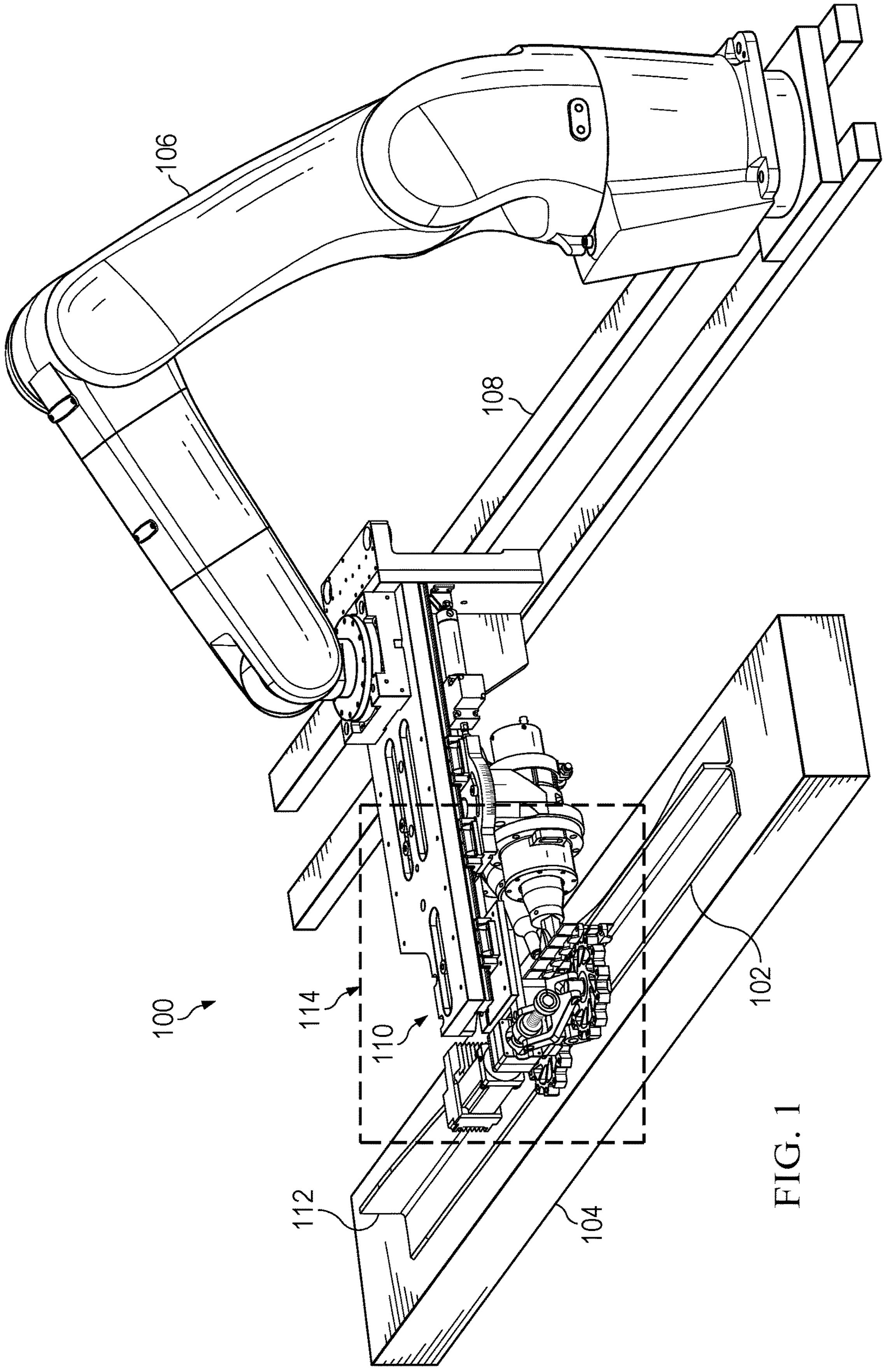
FIG. 1 is an illustration of a perspective view of a composite manufacturing system in accordance with an illustrative embodiment.

With reference now to the figures and, in particular, with reference to FIG. 1, an illustration of a perspective view of a composite manufacturing system is depicted in accordance with an illustrative embodiment. Composite manufacturing system 100 comprises a combination of automated components and/or devices capable of performing processing on uncured composite structure 102.

As depicted, composite manufacturing system 100 includes tool 104, robotic arm 106, and trimming and scrap removal system 110. Trimming and scrap removal system 110 is used to cut or trim composite material 112 in its uncured state and separate the scrap from the trimmed composite material before the scrap has a chance to heat weld itself back to the trimmed composite material. It is understood that in the context of this disclosure, cutting and trimming the composite material is synonymous and the terms cut and trim may be used interchangeably.

As depicted, robotic arm 106 is on rails 108. Rails 108 allow movement about the manufacturing environment. Section 114 with trimming and scrap removal system 110 and a portion of uncured composite structure 102 is shown in greater detail in FIG. 3.

Figure 2:
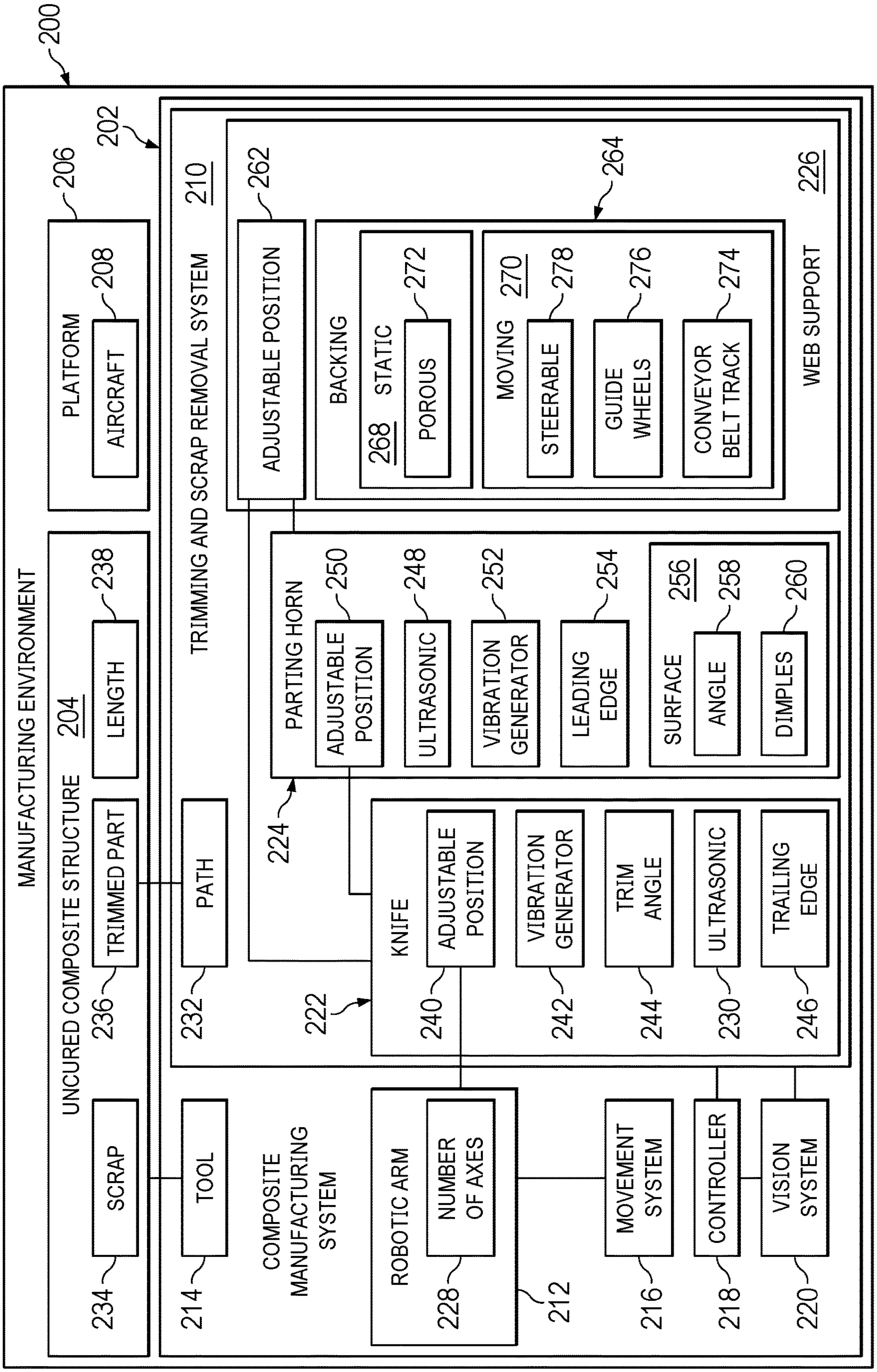
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within composite manufacturing system 202 may be used to fabricate a composite structure. Specifically, composite manufacturing system 202 is used to perform processes on uncured composite structure 204 in this illustrative example.

Uncured composite structure 204, after being cured, is a structure configured for use in platform 206. Platform 206 may be, for example, without limitation, a mobile platform, a stationary platform, a land-based structure, an aquatic-based structure, or a space-based structure. More specifically, platform 206 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 208 in this illustrative example. When uncured composite structure 204 is manufactured for aircraft 208, uncured composite structure 204 may be, for example, without limitation, a stringer, a spar, a rib, a panel, a stabilizer, a skin panel, or some other suitable structure configured for use in aircraft 208.

As depicted, composite manufacturing system 202 comprises trimming and scrap removal system 210, robotic arm 212, tool 214, movement system 216, controller 218, and vision system 220. Trimming and scrap removal system 210 takes the form of an end effector for robotic arm 212 such that trimming and scrap removal system 210 is connected to robotic arm 212. Trimming and scrap removal system 210 may be removably connected to robotic arm 212 such that if robotic arm 212 is needed to perform other processes, trimming and scrap removal system 210 may be removed and another end effector can be attached to robotic arm 212. Robotic arm 212 moves trimming and scrap removal system 210 about number of axes 228 as desired relative to uncured composite structure 204. As used herein, "a number of" when used with reference to items means one or more items. Thus, a number of axes is one or more axes.

As illustrated, tool 214 is configured to support and hold uncured composite structure 204 in place during processing. Tool 214 may include one or more support structures such as a clamp, a bladder, a ballast, a block or some other suitable structure for holding uncured composite structure 204 in place during processing.

In this illustrative example, trimming and scrap removal system 210 includes knife 222, parting horn 224, and web support 226.

When cutting/trimming uncured composite structure 204 with trimming and scrap removal system 210, knife 222 cuts uncured composite structure 204 along path 232. As knife 222 cuts or trims uncured composite structure 204 along path 232, scrap 234 is trimmed from trimmed part 236. Parting horn 224 separates scrap 234 from trimmed part 236 so that the scrap does not become heat welded back to trimmed part 236. Web support 226 provides a firm, planar surface that supports the portion of uncured composite structure 204 being trimmed. In other words, web support 226 acts a cutting board for knife 222.

Knife 222 takes the form of an ultrasonic 230 knife in this illustrative example. The position of knife 222 relative to robotic arm 212 is adjustable 240. Knife 222, being ultrasonic 230, includes a corresponding vibration generator 242. Knife 222 has trim angle 244. Trim angle 244 is important to the success of the cut. An optimal trim angle 244 ranges from 20°-60° relative to the uncured composite structure. Based on signals received from vision system 220 and controller 218, trim angle 244 may be adjusted to provide a desired shape of cut for uncured composite structure 204. In an example, trim angle 244 may be adjusted dynamically in response to changes in dimension or curvature in uncured composite structure 204 as trimming and scrap removal system 210 moves along path 232. A typical ultrasonic knife blade is generally triangular in shape. As a result, knife 222 includes trailing edge 246. Trailing edge 246 will be used to position parting horn 224 relative to knife 222. In this illustrative example, path 232 is normally a predetermined and programmed trim path but can also be dynamically adjusted during use. Knife 222 follows path 232 along the entire length 238 of uncured composite structure 204.

Parting horn 224 takes the form of an ultrasonic 248 parting horn in this illustrative example. The position of parting horn 224 relative to knife 222 is adjustable 250. As is the position of knife 222, the position of parting horn 224 relative to robotic arm 212 is also adjustable 240. Parting horn 224, being ultrasonic 248, includes a corresponding vibration generator 252. Vibration generator 252 is separate from vibration generator 242 for knife 222. It may be necessary for knife 222 and parting horn 224 to vibrate at different frequencies to affect a desired cut/trim and scrap removal. Parting horn 224 is generally wedge shaped and includes leading edge 254. Parting horn 224 is positioned relative to knife 222 such that leading edge 254 of parting horn 224 is generally parallel with trailing edge 246 of knife 222. The distance between knife 222 and parting horn 224 depends on several factors such as the uncured composite structure 204 to be trimmed and the rate at which trimming and scrap removal system 210 moves along path 232. It is important that the distance between knife 222 and parting horn 224 is enough such that they do not touch. Damage to knife 222 or parting horn 224 or both would most likely occur if the two ultrasonic components were to touch during operation.

Parting horn 224 is generally wedge shaped and includes surface 256 which contacts scrap 234. From the wedge shape of parting horn 224, surface 256 is at angle 258 relative to path 232. Angle 258 is generally at a 1 to 5 rise-over-run ratio. Further, parting horn 224 is spaced from trimmed part 236 such that parting horn 224 imparts zero forces on trimmed part 236. As illustrated, surface 256 may include dimples 260.

The position of web support 226 relative to knife 222 is adjustable 262. The position of web support 226 relative to parting horn 224 is adjustable 262. As is the position of knife 222 and the position of parting horn 224, the position of web support 226 relative to robotic arm 212 is also adjustable 262. Web support 226 includes backing 264. Backing 264 is generally planar. Backing 264 can be static 268 or moving 270.

Static 268 backing 264 is understood to mean that as knife 222 and parting horn 224 and web support 226 move as a system along path 232, uncured composite structure 204 slides across a backing 264 of web support 226. In other words, as trimming and scrap removal system 210 moves along path 232, the components of trimming and scrap removal system 210 including knife 222, parting horn 224, and web support 226 move together relative to uncured composite structure 204. Backing 264 of static 268 web support 226 that supports uncured composite structure 204 as uncured composite structure 204 is being trimmed is porous 272. The porous nature of web support 226 when static 268 releases positive air pressure as uncured composite structure 204 is cut and creates an air gap to reduce friction between uncured composite structure 204 and web support 226.

A reduced friction surface between uncured composite structure 204 and web support 226 provided by porous 272 static 268 backing 264 helps to prevent trimmed part 236 from inadvertently sticking to web support 226 as trimming and scrap removal system 210 moves along path 232. A reduced friction surface between uncured composite structure 204 and web support 226 helps prevent or at least minimizes stresses, strains, wrinkling, or any other defect that may occur in trimmed part 236 should trimmed part stick to web support 226.

Moving 270 backing 264 includes conveyor belt track 274. Conveyor belt track 274 is a continuous tread riding on guide wheels 276. Conveyor belt track 274 and guide wheels 276 operate in a similar manner to a treadmill or tank tread. As trimming and scrap removal system 210 moves along uncured composite structure 204 on path 232, conveyor belt track 274 rolls on uncured composite structure 204. Guide wheels 276 are dynamically steerable 278 in order adjust the position of conveyor belt track 274 in order to accommodate varying web heights of uncured composite structure 204 and curvature along the length of uncured composite structure 204.

Controller 218 is a device that controls the behavior of the components within trimming and scrap removal system 210. Based on information from vision system 220 and other systems, controller 218 adjusts parameters for trimming and scrap removal system 210. Specifically, controller 218 is configured to adjust at least one of rate of speed knife 222 cuts uncured composite structure 204, direction, position, depth, and trim angle 244 based on information received from components in trimming and scrap removal system 210.

For example, without limitation, as the thickness of uncured composite structure 204 increases along path 232, controller 218 may slow down trimming and scrap removal system 210 to promote the integrity of the cut, reduce blade deflection, and reduce the risk of deformation of knife 222. In other cases, if the composite material is thin, trimming and scrap removal system 210 may move faster through these portions of uncured composite structure 204 to promote efficiency in processing. Adjustments in other parameters allow for trimming of uncured composite structure 204 in multiple geometries and to correct trimming and scrap removal system 210 as desired in real time.

As used herein, the phrase “at least one of,” when used with a list of items, means different combinations of one or more of the listed items may be used, and only one of each item in the list may be needed. In other words, “at least one of” means any combination of items and number of items may be used from the list, but not all of the items in the list are required. The item may be a particular object, a thing, or a category.

For example, “at least one of item A, item B, or item C” may include, without limitation, item A, item A and item B, or item B. This example also may include item A, item B, and item C, or item B and item C. Of course, any combination of these items may be present. In other examples, “at least one of” may be, for example, without limitation, two of item A, one of item B, and ten of item C; four of item B and seven of item C; or other suitable combinations.

Vision system 220 provides visual feedback for trimming and scrap removal system 210. Vision system 220 may include a camera, a video camera, laser sensors, or other suitable components. Vision system 220 provides visual feedback as trimming and scrap removal system 210 follows path 232 along uncured composite structure 204. Vision system 220 provides information to controller 218.

In this depicted example, movement system 216 is associated with robotic arm 212. Movement system 216 comprises various components configured to move robotic arm 212 along length 238 of uncured composite structure 204 to trim uncured composite structure 204. Movement system 216 may take the form of rails, wheels, or other suitable movement mechanisms. In some cases, movement system 216 and robotic arm 212 may comprise an autonomous vehicle capable of moving freely about manufacturing environment 200.

With an illustrative embodiment, composite manufacturing system 202 can work more efficiently and with more versatility to trim uncured composite structure 204 than previously contemplated. As a result, uncured composite structure 204 is formed more quickly and with less rework than with currently used systems.

The illustrative embodiments are designed to allow for trimming and scrap removal system 210 to cut uncured composite structures and separate scrap 234 from trimmed part 236 before scrap has a chance to heat weld back to trimmed part. Parting horn 224 pushes scrap 234 away from trimmed part 236 of uncured composite structure 204 while parting horn 224 exerts no force on trimmed part 236 of uncured composite structure 204. Robotic arm 212 moves trimming and scrap removal system 210 about uncured composite structure 204 such that flipping is not necessary, thus reducing manpower. All parameters of trimming and scrap removal system 210, including the positions of knife 222, parting horn 224, and web support 226 relative to each other, may be adjusted in real time, allowing trimming and scrap removal system 210 to perform more complex operations than previously used systems.

Figure 3:
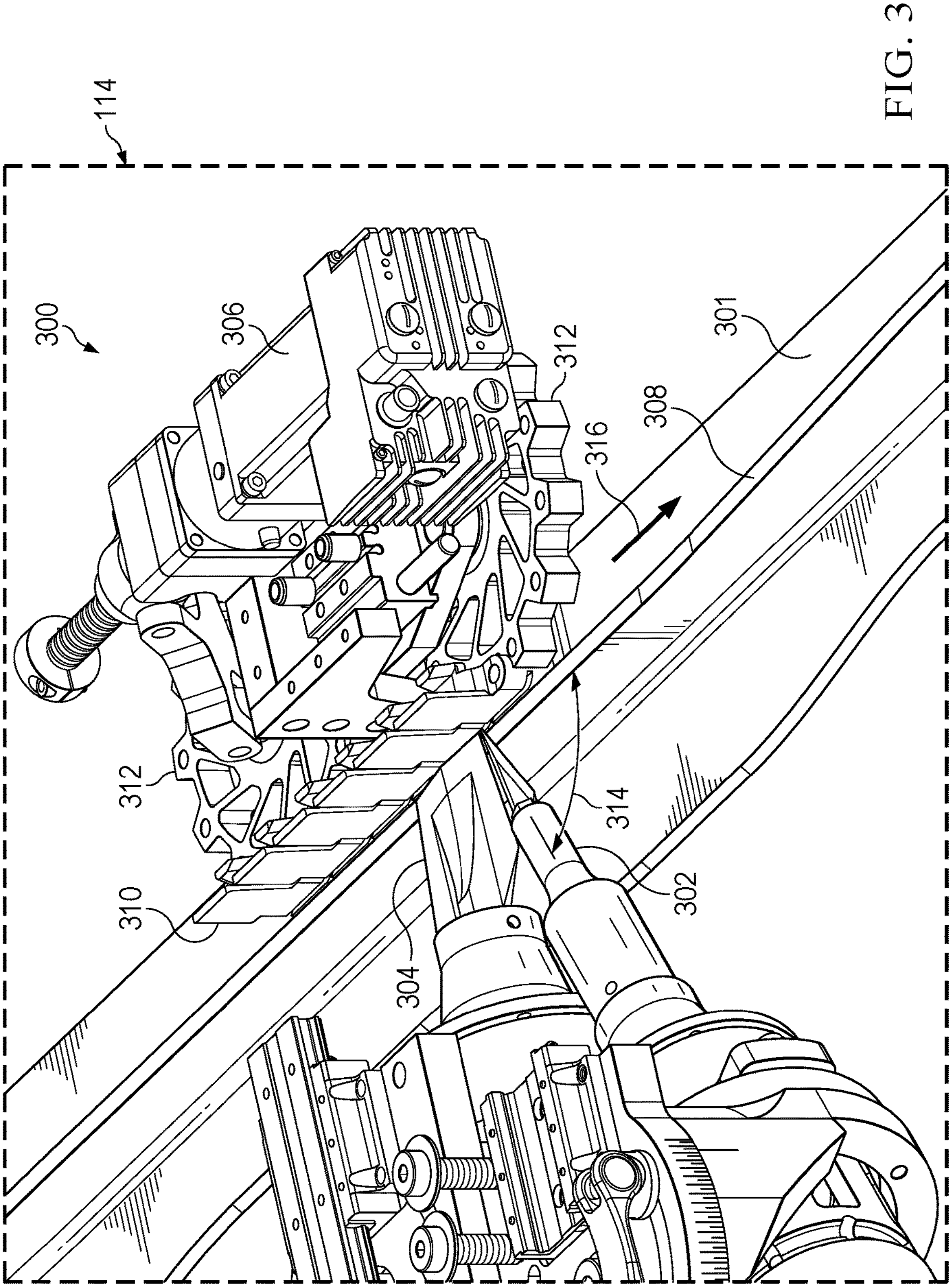
FIG. 3 is an illustration of a perspective view of a trimming and scrap removal system in accordance with an illustrative embodiment.

With reference next to FIG. 3, an illustration of a perspective view of a trimming and scrap removal system is depicted in accordance with an illustrative embodiment. FIG. 3 illustrates an example of physical implementations of components within composite manufacturing system 202 shown in block form in FIG. 2. A more-detailed view of section 114 from FIG. 1 is shown.

As depicted, trimming and scrap removal system 300 comprises knife 302, parting horn 304, and web support 306. Knife 302 may be an ultrasonic knife and parting horn 304 may be an ultrasonic parting horn. Knife 302 and parting horn 304 are each connected to separate vibration generators. Web support 306 includes backing 310 that moves around guide wheels 312. For clarity and illustration purposes, only a planar portion of backing 310 that contacts uncured composite structure 301 as trimming and scrap removal system 300 moves along uncured composite structure 301 is depicted. In actuality, backing 310 is a looped tread that moves around guide wheels 312. Trimming and scrap removal system 300 moves along path 308 in direction 316 along uncured composite structure 301.

As illustrated, knife 302 is positioned relative to uncured composite structure 301 at trim angle 314. Trim angle 314 ranges from 20°-60° relative to path 308 along the uncured composite structure.

Figure 4:
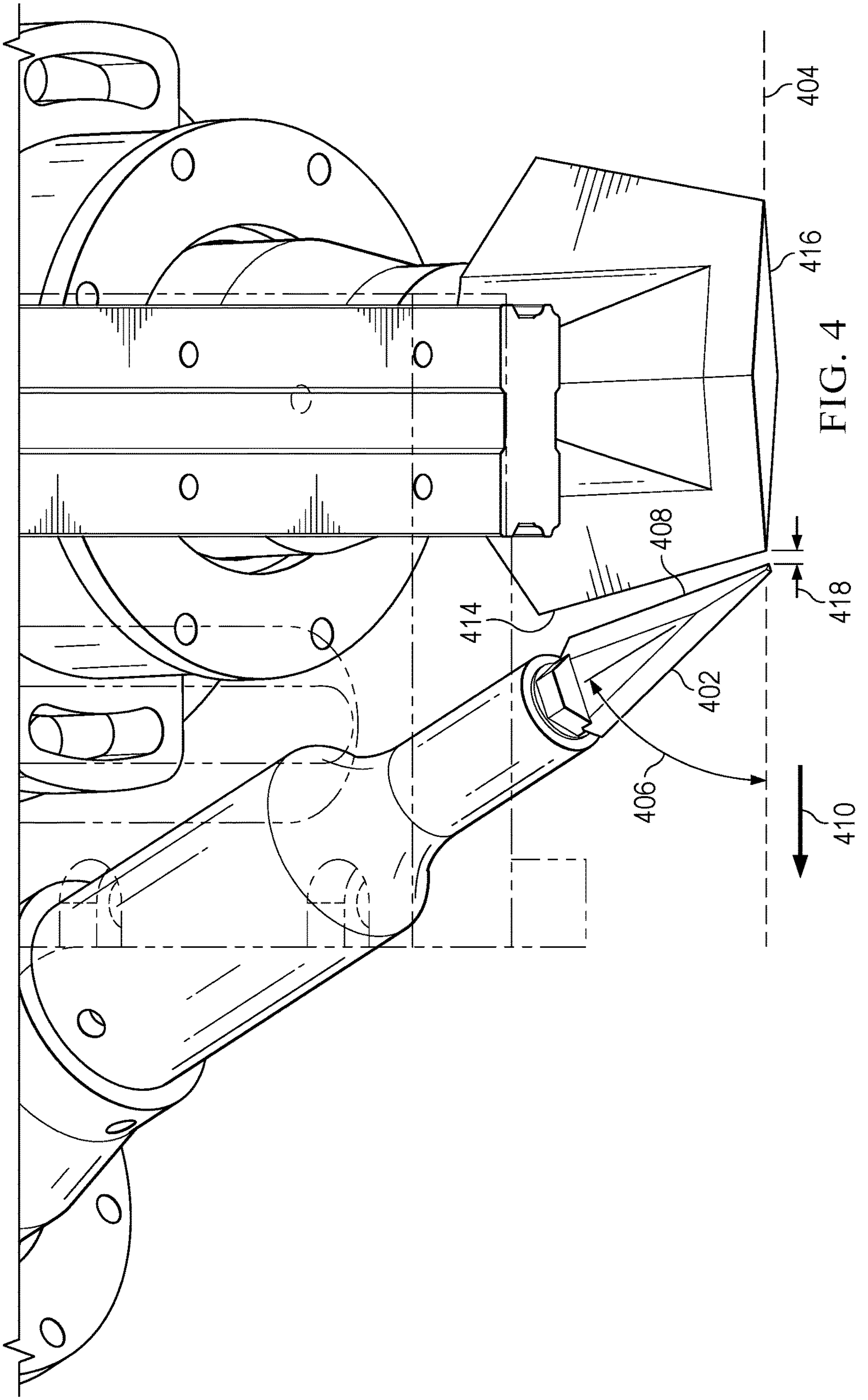
FIG. 4 is an illustration of a perspective view of a knife and a parting horn of a trimming and scrap removal system in accordance with an illustrative embodiment.
Figure 5:
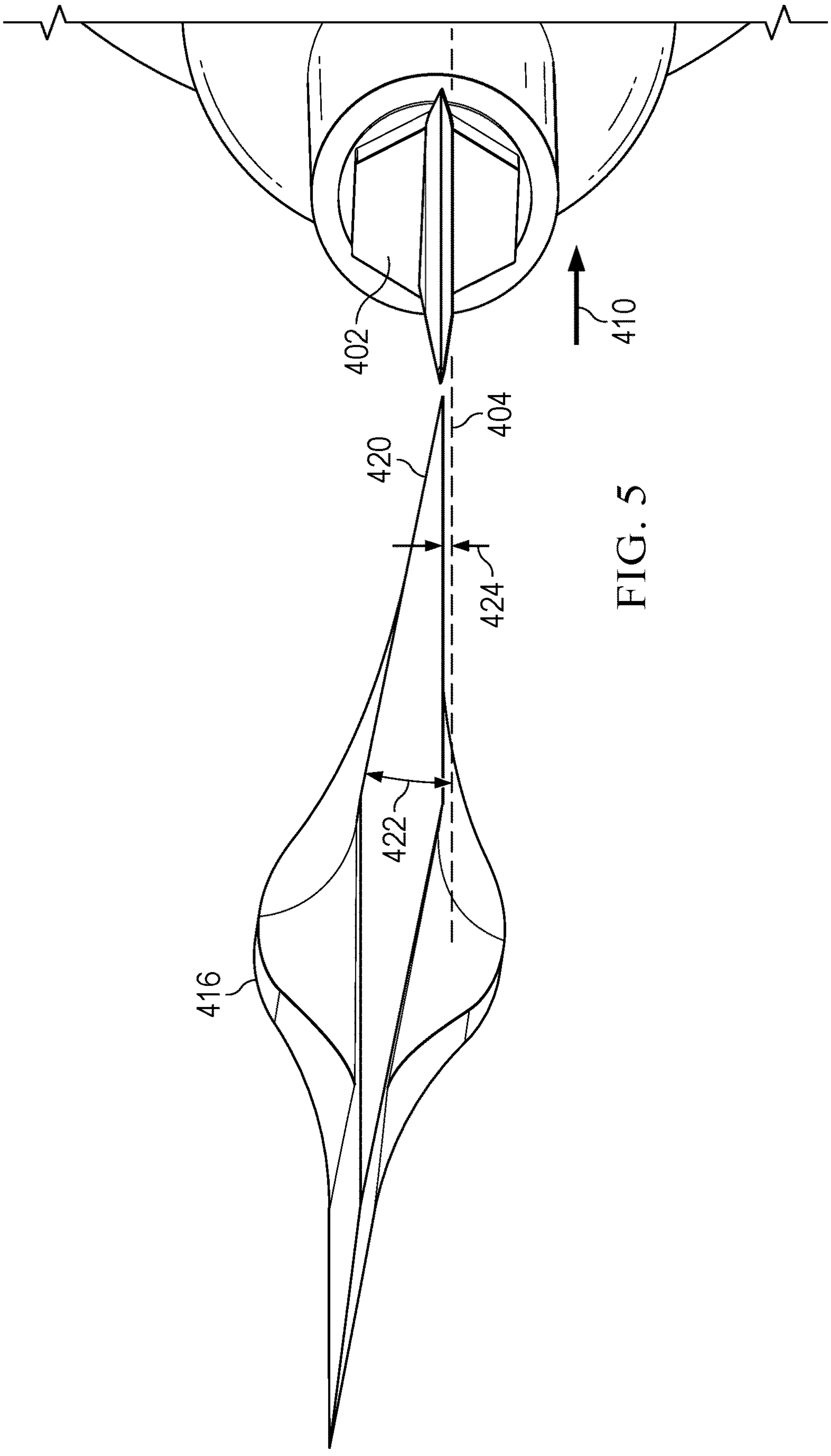
FIG. 5 is an illustration of a side view of a knife and a parting horn of a trimming and scrap removal system in accordance with an illustrative embodiment.

Turning now to FIG. 4, an illustration of a perspective view of a knife and a parting horn of a trimming and scrap removal system and to FIG. 5, an illustration of a side view of a knife and a parting horn of a trimming and scrap removal system is depicted in accordance with an illustrative embodiment. FIGS. 4 and 5 illustrate an example of physical implementations of knife 222 and parting horn 224 within trimming and scrap removal system 210 shown in block form in FIG. 2.

Knife 402 is positioned relative to path 404 at trim angle 406. The components of the trimming and scrap removal system move along path 404 in direction 410 to trim an uncured composite structure. Trailing edge 408 of knife 402 is generally parallel with leading edge 414 of parting horn 416. Parting horn 416 is spaced 418 from knife 402.

Parting horn 416 is generally wedge shaped and includes surface 420 which contacts the scrap trimmed from the uncured composite structure. From the wedge shape of parting horn 416, surface 420 is at angle 422 relative to path 404. Angle 422 is generally at a 1 to 5 rise-over-run ratio. Further, parting horn 416 is spaced distance 424 from path 404 or the trimmed part such that parting horn 224 imparts zero forces on the resulting trimmed part.

Figure 6:
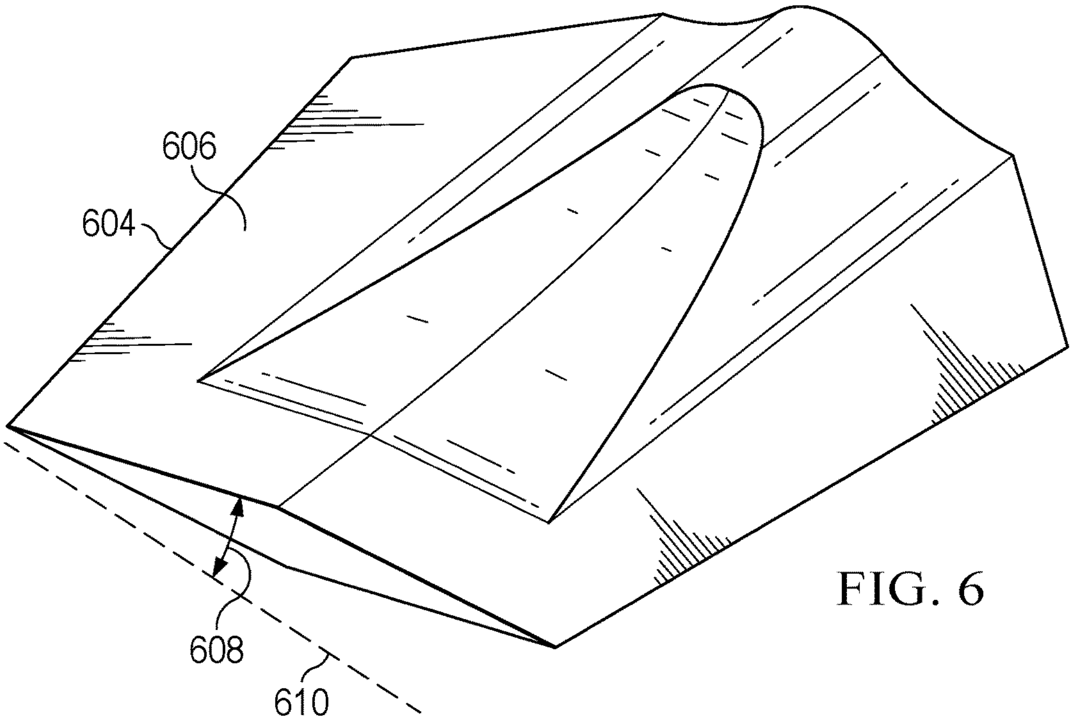
FIG. 6 is an illustration of a perspective view of a parting horn of a trimming and scrap removal system in accordance with an illustrative embodiment.
Figure 7:
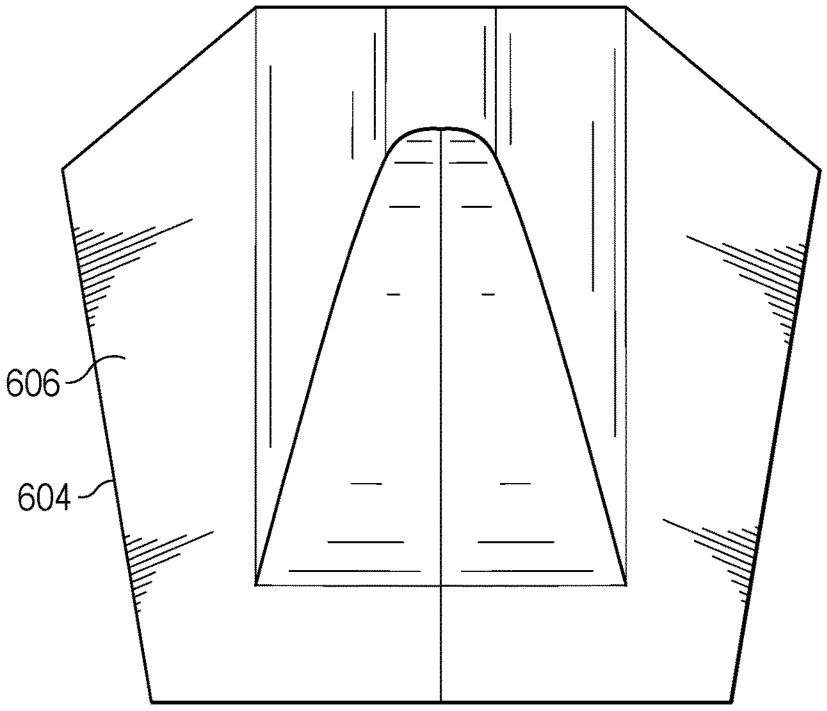
FIG. 7 is an illustration of a top view of a parting horn of a trimming and scrap removal system in accordance with an illustrative embodiment.

Turning now to FIG. 6, an illustration of a perspective view of a parting horn of a trimming and scrap removal system and to FIG. 7, an illustration of a top view of a parting horn of a trimming and scrap removal system is depicted in accordance with an illustrative embodiment. FIGS. 6 and 7 illustrate an example of physical implementations of parting horn 224 within trimming and scrap removal system 210 shown in block form in FIG. 2.

As depicted parting horn 602 is generally wedge shaped from the side and is symmetrical from the top. Parting horn 602 includes leading edge 604 and surface 606. Leading edge 604 is intentionally dull so that it does not inadvertently begin a second cutting path in the uncured composite structure. Surface 606 pushes scrap away from a trimmed part of the uncured composite structure while parting horn 602 exerts no force on the resultant trimmed part. Surface 606 is at angle 608 relative to path 610. Angle 608 is generally at a 1 to 5 rise-over-run ratio.

Figure 9:
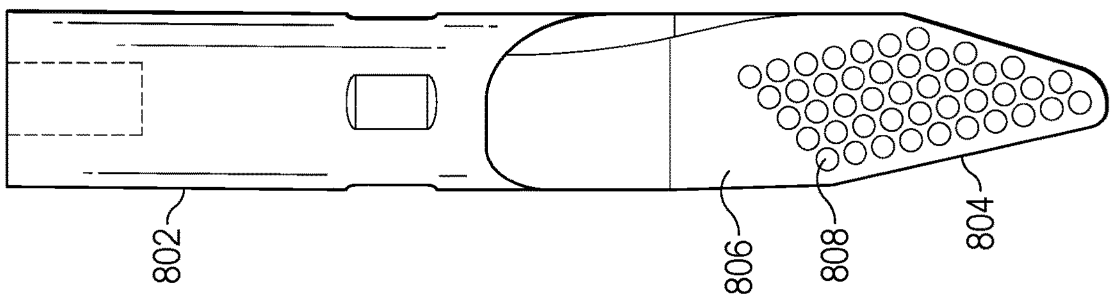
FIG. 9 is an illustration of a top view of a parting horn of a trimming and scrap removal system in accordance with an illustrative embodiment.
Figure 8:
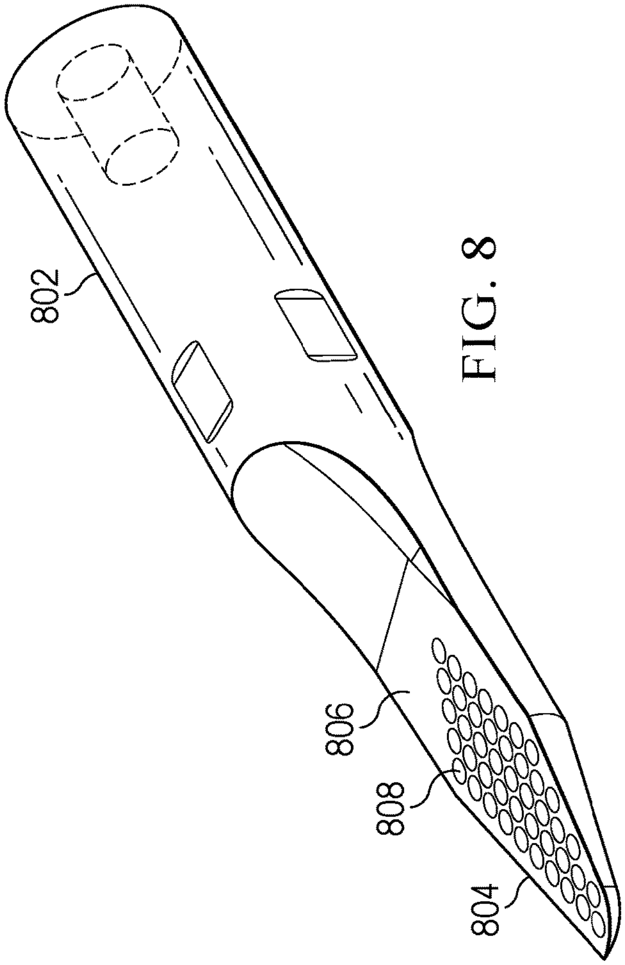
FIG. 8 is another illustration of a perspective view of a parting horn of a trimming and scrap removal system in accordance with an illustrative embodiment.

Turning now to FIG. 8, an illustration of a perspective view of a parting horn of a trimming and scrap removal system and to FIG. 9, an illustration of a top view of a parting horn of a trimming and scrap removal system is depicted in accordance with an illustrative embodiment. FIGS. 8 and 9 illustrate an example of physical implementations of parting horn 224 within trimming and scrap removal system 210 shown in block form in FIG. 2.

As depicted parting horn 802 is generally wedge shaped from the side and is asymmetrical from the top. Parting horn 802 includes leading edge 804 and surface 806. Surface pushes scrap away from a trimmed part of the uncured composite structure while parting horn 802 exerts no force on the resultant trimmed part. Surface 806 includes dimples 808. Dimples 808 reduce contact surface area with the scrap and thus reduce friction on surface 806 to allow scrap to slide off parting horn 802.

Figure 10:
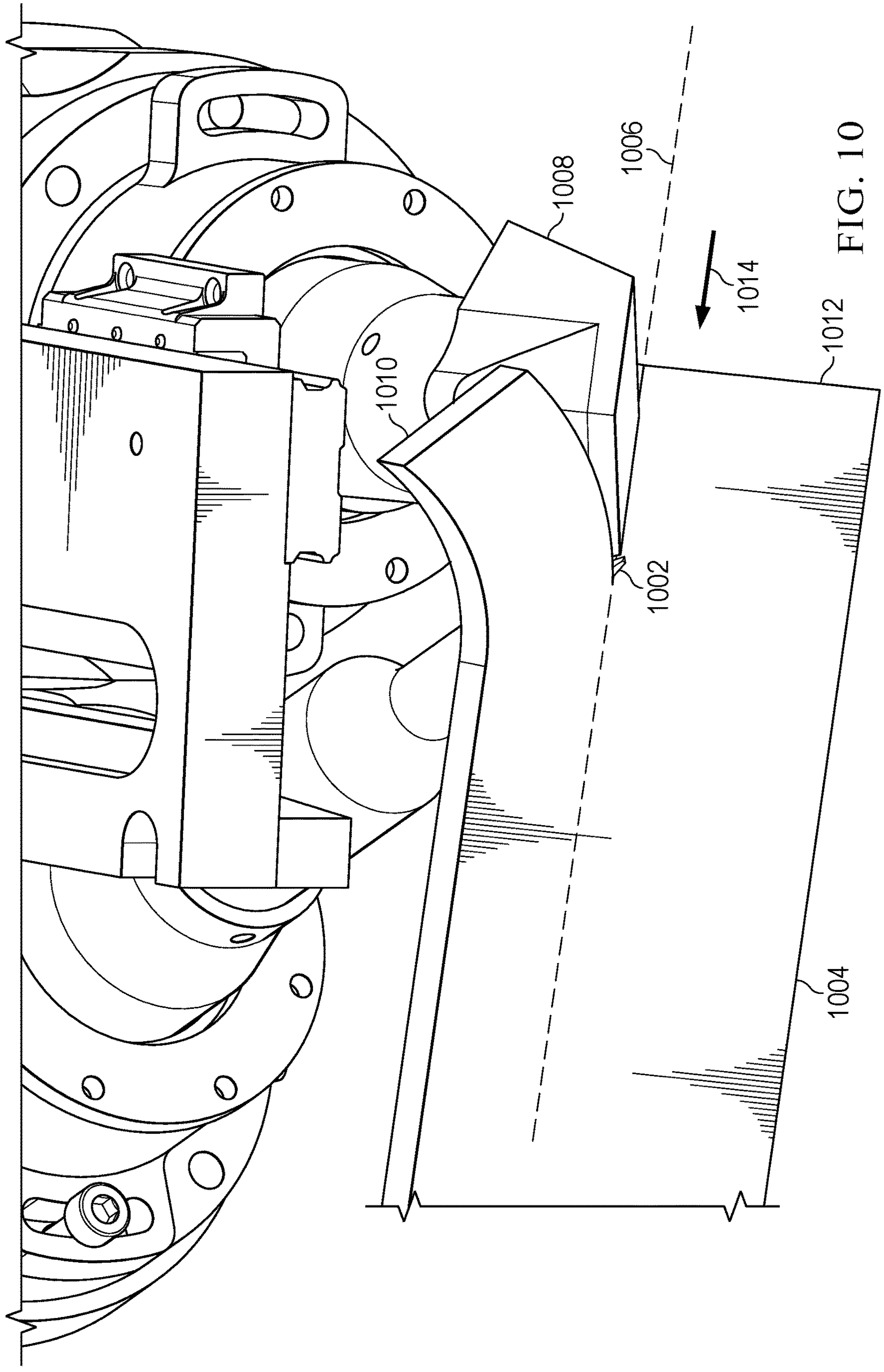
FIG. 10 is an illustration of a perspective view of a cut in an uncured composite structure in accordance with an illustrative embodiment.

With reference next to FIG. 10, an illustration of a perspective view of a cut in an uncured composite structure is depicted in accordance with an illustrative embodiment. FIG. 10 illustrate an example of physical implementations of knife 222 and parting horn 224 within trimming and scrap removal system 210 shown in block form in FIG. 2.

Knife 1002 cuts through uncured composite structure 1004 along path 1006. Parting horn 1008 pushes scrap 1010 away from trimmed part 1012 as knife 1002 and parting horn 1008 move along path 1006 in direction 1014.

Figure 11:
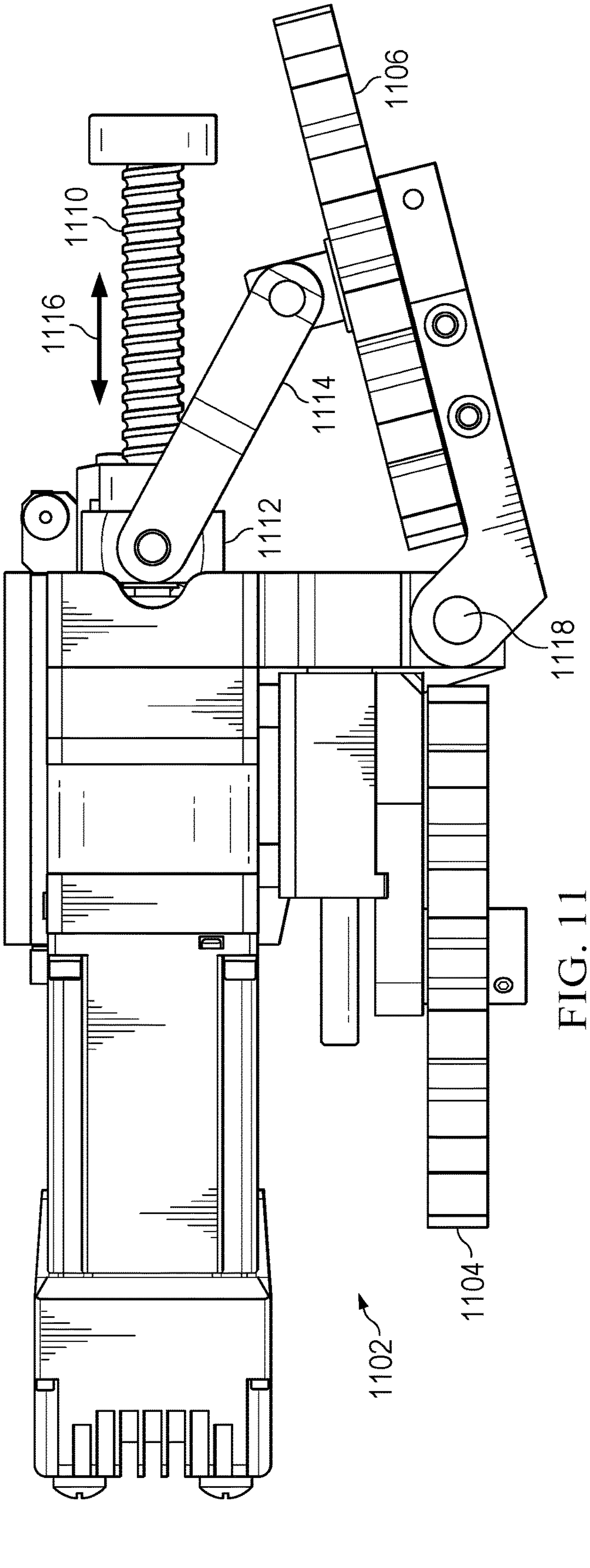
FIG. 11 is an illustration of a side view of guide wheels of a web support of a trimming and scrap removal system in accordance with an illustrative embodiment.
Figure 12:
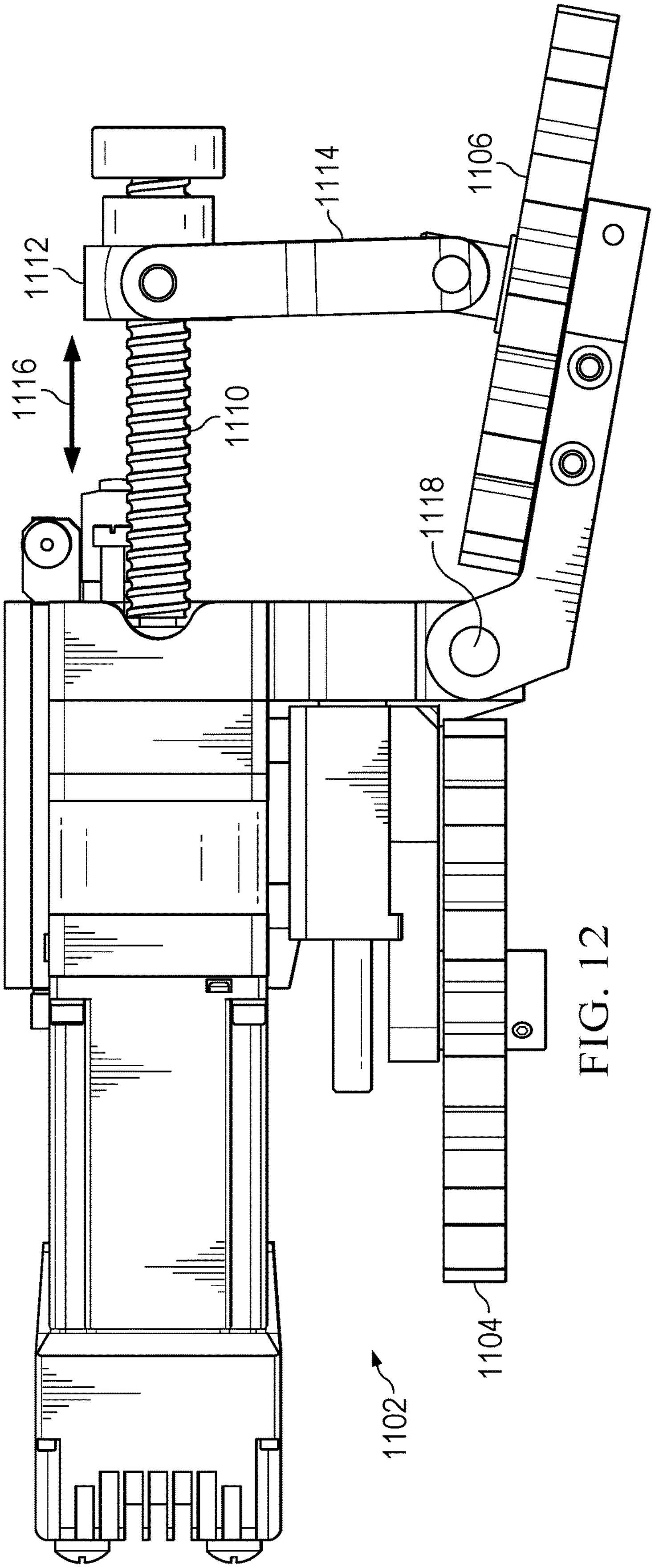
FIG. 12 is an illustration of a side view of guide wheels of a web support of a trimming and scrap removal system in accordance with an illustrative embodiment.

Turning now to FIG. 11 and FIG. 12, illustrations of a side view of guide wheels of a web support of a trimming and scrap removal system are depicted in accordance with an illustrative embodiment. FIGS. 11 and FIG. 12 illustrate an example of physical implementations web support 226 and guide wheels 276 within trimming and scrap removal system 210 shown in block form in FIG. 2.

For clarity and ease of illustration, web support 226 is depicted without a backing in order to show the relative movements of guide wheels 1104 and 1106. In this illustrative embodiment, backing (not shown) is a moving backing and is in the form of a conveyor belt track looped around guide wheels 1104 and 1106.

A position of guide wheel 1106 is adjustable with respect to guide wheel 1104. Rotation of ball screw 1110 forces collar 1112 to translate in direction 1116 along the length of ball screw 1110. Ball screw 1110 may rotate in either direction thus converting lateral movement of collar 1112 in either direction 1116. As collar 1112 translates in direction 1116, link 1114 connected to guide wheel 1106 forces guide wheel 1106 to pivot about pivot point 1118. The position of guide wheel 1106 is dynamically adjustable in order adjust the position of the conveyor belt track of the backing (not shown) to accommodate varying web heights and curvature along the length of the uncured composite structure to be trimmed. As guide wheel 1106 moves, both guide wheels work in conjunction to position the backing (not shown) of the web support such that the backing always provides a firm planar support surface supporting the uncured composite material as the knife cuts the uncured composite material.

Figure 13:
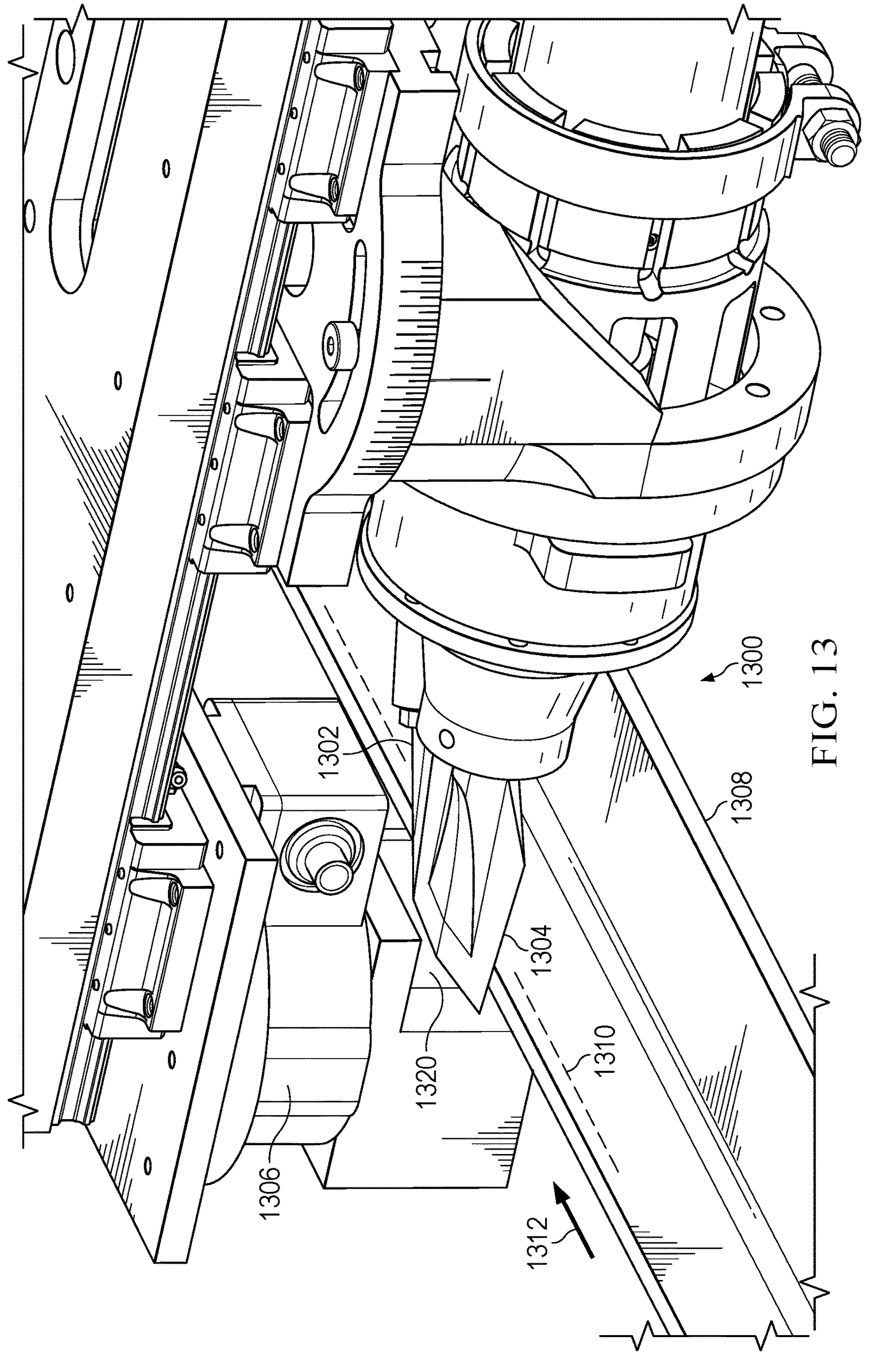
FIG. 13 is an illustration of a perspective view of a web support of a trimming and scrap removal system in accordance with an illustrative embodiment.

With reference next to FIG. 13, an illustration of a perspective view of a web support of a trimming and scrap removal system is depicted in accordance with an illustrative embodiment. FIG. 13 illustrates an example of physical implementations of knife 222, parting horn 224, and web support 226 within trimming and scrap removal system 210 shown in block form in FIG. 2.

Knife 1302 is positioned relative to parting horn 1304. Web support 1306 supports the web of uncured composite structure 1308 as trimming and scrap removal system 1300 moves along path 1310 in direction 1312. Web support 1306 includes backing 1320. Backing 1320 is static. Backing 1320 is porous. As trimming and scrap removal system 1300 moves along path 1310 in direction 1312, uncured composite structure 1308 and the resultant trimmed part slide against backing 1320. The porous nature of backing 1320 releases positive air pressure as uncured composite structure 1308 is cut and creates an air gap to reduce friction between uncured composite structure 1308 and web support 1306.

The different components shown in FIG. 1 and FIGS. 3-13 may be combined with components in FIG. 2, used with components in FIG. 2, or a combination of the two. Additionally, some of the components in FIG. 1 and FIGS. 3-13 may be illustrative examples of how components shown in block form in FIG. 2 may be implemented as physical structures.

Other configurations for composite manufacturing system 100 may be implemented other than those shown in FIGS. 1 and FIGS. 3-13. For instance, although only one robotic arm with one trimming and scrap removal system is shown in FIG. 1 and FIGS. 3-13, two, three, five, or more robotic arms may be used at the same time. In such an illustrative example, the robotic arms may be performing the same processes or different processes at substantially the same time along the length of the composite structure. In other illustrative examples, uncured composite structure 102 may be held in an alternative configuration than shown herein.

Although the illustrative embodiments are shown and described with reference to forming stringers for aircraft applications, the illustrative embodiments can be used with any type of platform to trim and remove scrap from composite parts for that platform.

Figure 14:
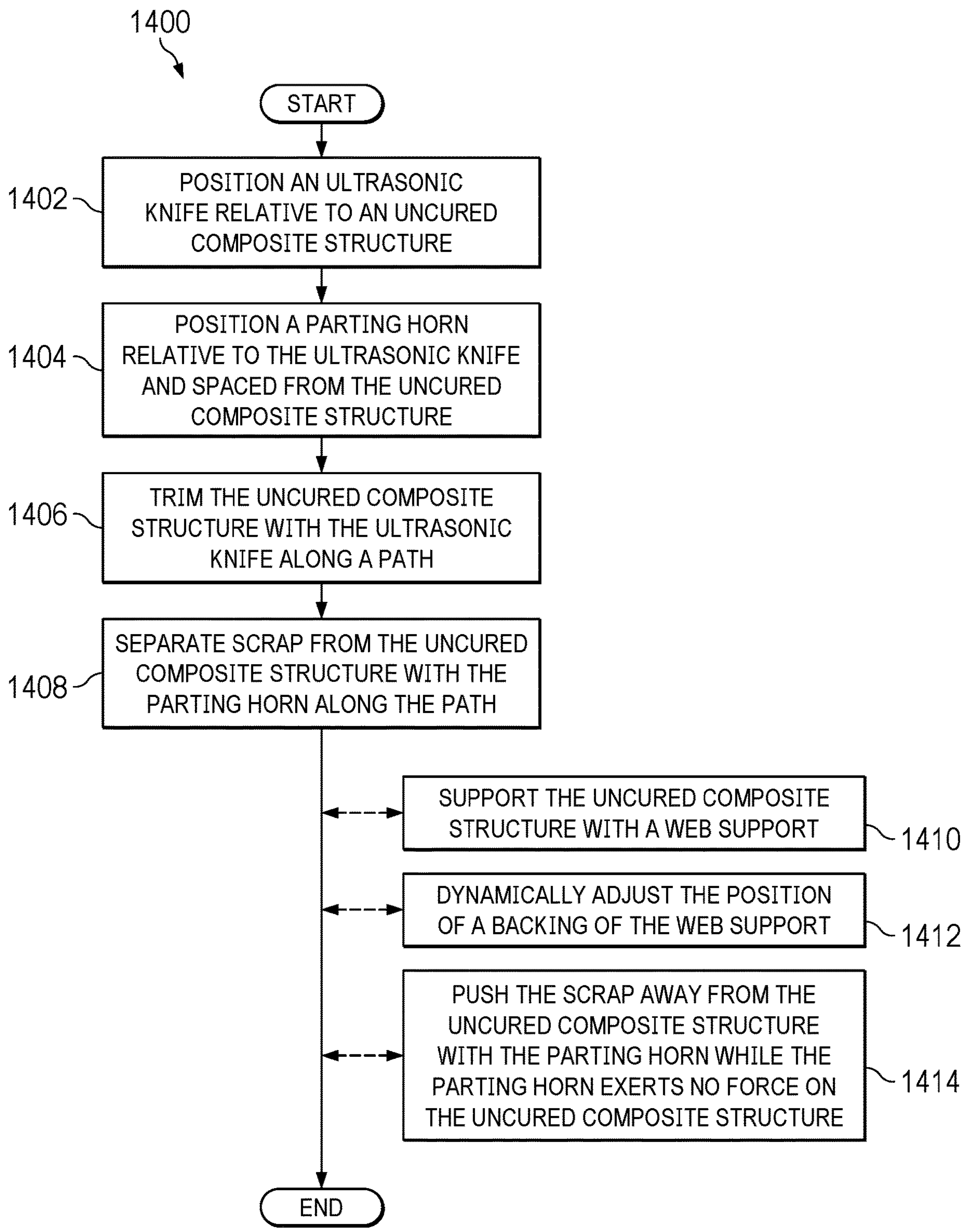
FIG. 14 is illustration of a flowchart of a process for trimming and removing scrap from a composite structure in accordance with an illustrative embodiment.

With reference next to FIG. 14, an illustration of a flowchart of a process 1400 for trimming and removing scrap from a composite structure is depicted in accordance with an illustrative embodiment. The method depicted in FIG. 14 may be used with trimming and scrap removal system 210 to trim and remove scrap from uncured composite structure 204 in FIG. 2.

The process begins by positioning an ultrasonic knife relative to an uncured composite structure (operation 1402). The ultrasonic knife is connected to a robotic arm. The ultrasonic knife is positioned at a trim angle relative to the path of a trimming and scrap removal system. Next, an a parting horn is positioned relative to the ultrasonic knife and spaced from the uncured composite structure (operation 1404). The parting horn is connected to a robotic arm. the uncured composite structure is trimmed with the ultrasonic knife along the path (operation 1406).

Thereafter, the parting horn separates scrap from the uncured composite structure along the path (operation 1408). At operation 1410, the uncured composite structure is supported with a web support. If needed, the position of a backing of the web support is dynamically adjusted (operation 1412). Scrap is pushed away from the uncured composite structure with the parting horn while the parting horn exerts no force on the uncured composite structure (operation 1414).

Figure 15:
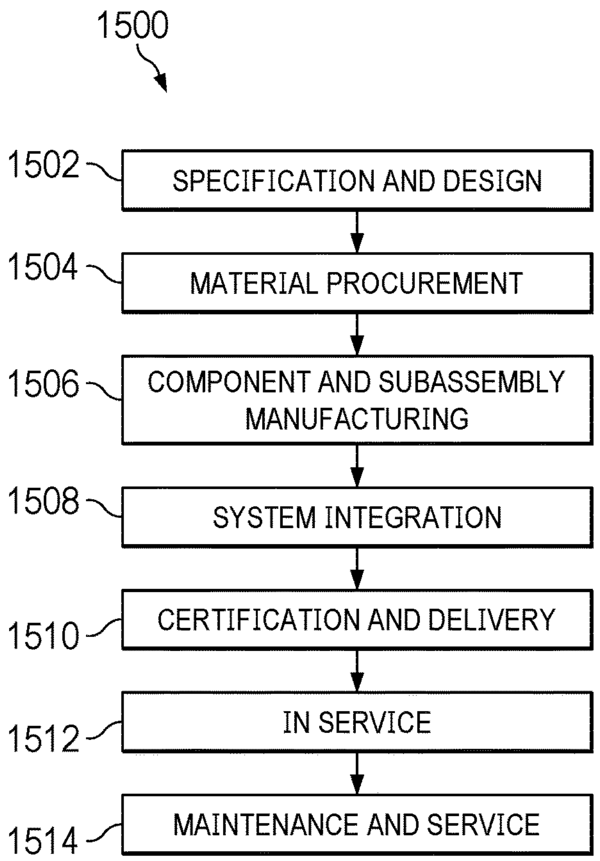
FIG. 15 is an illustration of a block diagram of an aircraft manufacturing and service method in accordance with an illustrative embodiment.
Figure 16:
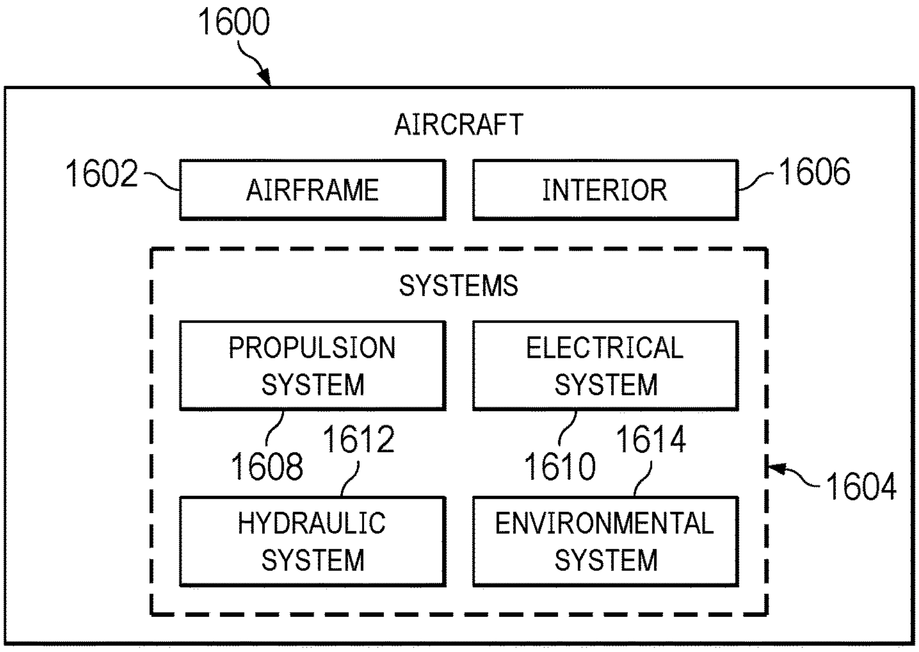
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of a block diagram of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Uncured composite structure 204 from FIG. 2 may be made using composite manufacturing system 202 with trimming and scrap removal system 210 during component and subassembly manufacturing 1506. In addition, trimming and scrap removal system 210 may be used during routine maintenance and service 1514 as part of a modification, reconfiguration, or refurbishment of aircraft 1600 in FIG. 16.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 16, an illustration of a block diagram of an aircraft is depicted in which a composite structure made using an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of aircraft 1600, reduce the cost of aircraft 1600, or both expedite the assembly of aircraft 1600 and reduce the cost of aircraft 1600.

With the use of an illustrative embodiment, a composite manufacturing system can work more efficiently with less risk of heat welding scrap material back to a trimmed part. The ultrasonic parting horn of the disclosed trimming and scrap removal system is configured to separate scrap from the uncured composite structure so that the scrap does not stick to the trimmed part. Composite structures may be trimmed prior to or after curing and multiple robots may move about the manufacturing environment to trim the composite structure at the same time.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A trimming and scrap removal system for composite structures comprising:

an ultrasonic knife connected to a robotic arm, the ultrasonic knife configured to trim an uncured composite structure along a path to form a trimmed part and scrap, wherein the ultrasonic knife comprises a first vibration generator configured to vibrate at a desired trimming frequency;

an ultrasonic parting horn connected to the robotic arm, the ultrasonic parting horn configured to separate the scrap from the trimmed part, wherein a position of the ultrasonic parting horn relative to the ultrasonic knife is adjustable and wherein the ultrasonic parting horn is spaced from the trimmed part in order to not contact the trimmed part such that the ultrasonic parting horn imparts zero forces on the trimmed part based on contact with the trimmed part, and wherein the ultrasonic parting horn comprises a second vibration generator configured to vibrate at a desired parting frequency that is separately adjustable from the desired trimming frequency; and a web support connected to the robotic arm, the web support providing a firm, planar surface to support the uncured composite structure, wherein a position of the web support relative to both the ultrasonic knife and the ultrasonic parting horn is adjustable.

2. The trimming and scrap removal system of claim 1, wherein the ultrasonic knife comprises a trailing edge, and wherein the position of the ultrasonic parting horn relative to the ultrasonic knife is adjustable based on the trailing edge.

3. The trimming and scrap removal system of claim 1, wherein a leading edge of the ultrasonic parting horn is parallel with a trailing edge of the ultrasonic knife.

4. The trimming and scrap removal system of claim 1, wherein the ultrasonic parting horn is spaced from the uncured composite structure and a surface of the ultrasonic parting horn contacts the scrap.

5. The trimming and scrap removal system of claim 4, wherein the surface of the ultrasonic parting horn is oriented at an angle relative to the path of the ultrasonic knife at a 1 to 5 rise-over-run ratio.

6. The trimming and scrap removal system of claim 4, wherein the surface of the ultrasonic parting horn comprises dimples.

7. The trimming and scrap removal system of claim 1, wherein the web support is porous and is static with respect to the ultrasonic knife and the ultrasonic parting horn.

8. The trimming and scrap removal system of claim 1, wherein the web support comprises guide wheels in contact with a conveyor belt track.

9. The trimming and scrap removal system of claim 8, wherein a position of the conveyor belt track is dynamically adjustable in response to curvature along a length of the uncured composite structure.

10. The trimming and scrap removal system of claim 1, wherein the ultrasonic knife, the ultrasonic parting horn, and the web support move together along the path relative to the uncured composite structure.

11. The trimming and scrap removal system of claim 1, wherein the ultrasonic parting horn is wedge shaped and comprises:

a surface oriented at an angle relative to the path for contacting the scrap; and a planar surface opposite the surface, the planar surface spaced from the trimmed part and parallel with the path.

12. The trimming and scrap removal system of claim 1, wherein the ultrasonic knife and the ultrasonic parting horn do not touch as the uncured composite structure is trimmed.

13. A method for trimming and removing scrap from a composite structure, the method comprising:

positioning an ultrasonic knife relative to an uncured composite structure, wherein the ultrasonic knife is connected to a robotic arm, wherein the ultrasonic knife comprises a first vibration generator configured to vibrate at a desired trimming frequency;

positioning an ultrasonic parting horn relative to the ultrasonic knife and spaced from the uncured composite structure, wherein the ultrasonic parting horn is connected to the robotic arm, wherein the ultrasonic parting horn comprises a second vibration generator configured to vibrate at a desired parting frequency that is separately adjustable from the desired trimming frequency;

trimming the uncured composite structure with the ultrasonic knife along a path to form a trimmed part and scrap;

separating the scrap from the trimmed part with the ultrasonic parting horn along the path, wherein the ultrasonic parting horn is spaced from the trimmed part in order to not contact the trimmed part such that the ultrasonic parting horn imparts zero forces on the trimmed part based on contact with the trimmed part; and supporting the uncured composite structure with a firm, planar surface of a web support, wherein the web support is connected to the robotic arm and wherein a position of the web support relative to both the ultrasonic knife and the ultrasonic parting horn is adjustable.

14. The method for trimming and removing scrap from a composite structure of claim 13, further comprising dynamically adjusting the position of a backing of the web support in response to a curvature along a length of the uncured composite structure.

15. The method for trimming and removing scrap from a composite structure of claim 13, wherein separating the scrap from the uncured composite structure with the parting horn along the path further comprises pushing the scrap away from the uncured composite structure with the parting horn while the parting horn exerts no force on the uncured composite structure.

16. A composite manufacturing system comprising:

a robotic arm; and a trimming and scrap removal system for composite structures comprising:

an ultrasonic knife connected to the robotic arm; the ultrasonic knife configured to trim an uncured composite structure along a path to form a trimmed part and scrap, wherein the ultrasonic knife comprises a first vibration generator configured to vibrate at a desired trimming frequency; and an ultrasonic parting horn connected to the robotic arm, the parting horn configured to separate the scrap from the trimmed part, wherein a position of the ultrasonic parting horn relative to the ultrasonic knife is adjustable and wherein the ultrasonic parting horn is spaced from the trimmed part in order to not contact the trimmed part such that the ultrasonic parting horn imparts zero forces on the trimmed part based on contact with the trimmed part, and wherein the ultrasonic parting horn comprises a second vibration generator configured to vibrate at a desired parting frequency that is separately adjustable from the desired trimming frequency.

17. The composite manufacturing system of claim 16, wherein the ultrasonic knife comprises a trailing edge, and wherein the position of the ultrasonic parting horn relative to the ultrasonic knife is adjustable based on the trailing edge.

18. The composite manufacturing system of claim 16, wherein a leading edge of the parting horn is parallel with a trailing edge of the ultrasonic knife.

19. The composite manufacturing system of claim 16, wherein the parting horn is spaced from the uncured composite structure and a surface of the parting horn contacts the scrap.

20. The composite manufacturing system of claim 19, wherein the surface of the parting horn is oriented at an angle relative to the path of the ultrasonic knife at a 1 to 5 rise-over-run ratio.

21. The composite manufacturing system of claim 19, wherein the surface of the parting horn comprises dimples.

22. The composite manufacturing system of claim 16, wherein the trimming and scrap removal system further comprises a web support connected to the robotic arm, wherein a position of the web support relative to both the ultrasonic knife and the parting horn is adjustable.

23. The composite manufacturing system of claim 22, wherein the web support is porous and is static with respect to the ultrasonic knife and the parting horn.

24. The composite manufacturing system of claim 22, wherein the web support comprises guide wheels in contact with a conveyor belt track.

25. The composite manufacturing system of claim 24, wherein a position of the web support is adjustable relative to the ultrasonic knife and the parting horn.

26. The composite manufacturing system of claim 24, wherein a position of the conveyor belt track is dynamically adjustable in response to curvature along a length of the uncured composite structure.

27. The composite manufacturing system of claim 16, further comprising:

a controller; and a vision system;

wherein the vision system provides visual feedback as the trimming and scrap removal system follows the path along the uncured composite structure and wherein the controller, based on the visual feedback received from the vision system, adjusts parameters for the trimming and scrap removal system.

* * * * *